US008078979B2

(12) United States Patent
Howard et al.

(10) Patent No.: US 8,078,979 B2
(45) Date of Patent: Dec. 13, 2011

(54) WEB PAGE EDITOR WITH ELEMENT SELECTION MECHANISM

(75) Inventors: Robert M. Howard, Seattle, WA (US); Andrei Chtcherbatchenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 703 days.

(21) Appl. No.: 11/945,526

(22) Filed: Nov. 27, 2007

(65) Prior Publication Data
US 2009/0138810 A1 May 28, 2009

(51) Int. Cl.
*G06F 3/14* (2006.01)
*G06F 3/17* (2006.01)
(52) U.S. Cl. ............... 715/760; 715/250; 705/2; 705/4; 345/764; 382/305
(58) Field of Classification Search .......... 715/200–277; 700/701–866; 709/201–229; 705/50–79, 705/2, 4, 14; 345/30–111, 764; 348/206–231.9; 382/305; 358/1.15, 2.1; 707/1–10, 100–104.1, 707/200–206, 709
See application file for complete search history.

(56) References Cited

U.S. PATENT DOCUMENTS

| | | | |
|---|---|---|---|
| 5,329,613 A | 7/1994 | Brase et al. | |
| 6,760,043 B2 | 7/2004 | Markel | |
| 7,165,215 B2 * | 1/2007 | Tunning | 715/234 |
| 7,246,311 B2 | 7/2007 | Bargeron et al. | |
| 7,779,352 B1 * | 8/2010 | Underwood et al. | 715/250 |
| 7,817,307 B2 * | 10/2010 | Romney | 358/2.1 |
| 7,831,586 B2 * | 11/2010 | Reitter et al. | 707/709 |
| 2002/0089541 A1 * | 7/2002 | Orbanes et al. | 345/764 |
| 2005/0060205 A1 * | 3/2005 | Woods et al. | 705/4 |
| 2005/0069225 A1 * | 3/2005 | Schneider et al. | 382/305 |
| 2006/0007533 A1 | 1/2006 | Eichhorn et al. | |
| 2006/0022975 A1 | 2/2006 | Bredow et al. | |
| 2006/0146362 A1 * | 7/2006 | Romney | 358/1.15 |
| 2006/0236251 A1 | 10/2006 | Kataoka et al. | |
| 2006/0253791 A1 | 11/2006 | Kuiken et al. | |
| 2006/0271871 A1 | 11/2006 | Blaukopf et al. | |
| 2006/0293921 A1 * | 12/2006 | McCarthy et al. | 705/2 |
| 2007/0288454 A1 * | 12/2007 | Bolivar et al. | 707/5 |
| 2007/0288514 A1 * | 12/2007 | Reitter et al. | 707/104.1 |
| 2008/0183573 A1 * | 7/2008 | Muschetto | 705/14 |
| 2008/0221987 A1 * | 9/2008 | Sundaresan et al. | 705/14 |
| 2008/0307308 A1 * | 12/2008 | Sullivan et al. | 715/723 |

OTHER PUBLICATIONS

Getting Started with Pro/Engineer® Wildfire™ 2.0, A Tutorial-based Guide to Workflow, Jun. 2004, Parametric Technology Corporation, title page through p. xiii and pp. 2-1 through 2-10; 22 pages.
GRiNS, Layout overview, http://www.oratrix.com/DocSet/Content/Reference/R05-Layout.html (Copyright 2001); 11 pages.
Flowjo, http://www.flowjo.com/v7/html/lecontrols.html (Copyright 1996-1997 and 1997-2007); 4 pages.

* cited by examiner

*Primary Examiner* — Ruay Ho
(74) *Attorney, Agent, or Firm* — Merchant & Gould P.C.

(57) ABSTRACT

A web page editor displays a web page including at least two elements that are at least partially overlapping. The web page editor includes an element selection mechanism displaying a list of overlapping elements of the web page at a selected point on the web page. The element selection mechanism allows a user to unambiguously select between the elements of the web page at the selected location from the displayed list.

12 Claims, 7 Drawing Sheets

WEB PAGE EDITOR WITH ELEMENT SELECTION MECHANISM

BACKGROUND

The Internet is commonly used to share information in the form of web pages. Web pages can be designed using text editors to enter source code, usually in the form of a markup language, such as Hypertext Markup Language (HTML). The source code defines the desired content and arrangement of information. Once the source code has been written, it can be stored on a Web server, where it is made available to client computers. A browser application running on the client computer can request the source code, and generate a web page display based upon the source code.

Graphical web page editors have also been developed to aid in the design of a web page. Graphical web page editors are advantageous because the designer is not required to know the source code markup language. Instead, the designer can use visual representations of web page elements to define the information and arrangement of information on a web page. In other words, the graphical web page editor displays the web page under development in a form similar to how it will be displayed by a browser application.

SUMMARY

Embodiments of the present disclosure generally relate to a graphical web page editor. In one non-limiting example, the graphical web page editor includes an element selection mechanism for selecting at least one of a plurality of web page elements.

One aspect of the present disclosure is a computer readable storage medium containing computer executable instructions which when executed by a computer perform a method of selecting a web page element. The method comprises displaying a user interface of a web page editor, the user interface including a web page having web page elements; receiving a first input identifying a location on the web page; displaying a list of web page elements that are at the location with the user interface; receiving a second input identifying a first element from the list of web page elements; and selecting the first element.

Another aspect is a computing system comprising an input device for receiving input from a user; an output device for generating a user interface; a processor communicatively connected to the input device and the output device; and memory storing program instructions. The program instructions, which when executed by the processor cause the computing system to perform operations to implement a graphical web page editor including a web page element selection mechanism. The operations comprise displaying a web page with the output device, the web page including web page elements, wherein at least one of the web page elements is displayed as being located at least partially in front of another of the web page elements; receiving a first input from the input device identifying a location of the web page after displaying the web page; displaying a list of the web page elements that are at the location with the output device after receiving the first input; receiving a second input identifying a first element of the web page elements from the list; and selecting the first element of the web page elements after receiving the second input.

Yet another aspect is a method of selecting a web page element using a web page editor. The method comprises receiving a first input to initiate element selection; receiving a second input identifying a location on a web page after receiving the first input; displaying a list of web page elements that are at the location; receiving a third input identifying a first element from the list of web page elements; and selecting the first element.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
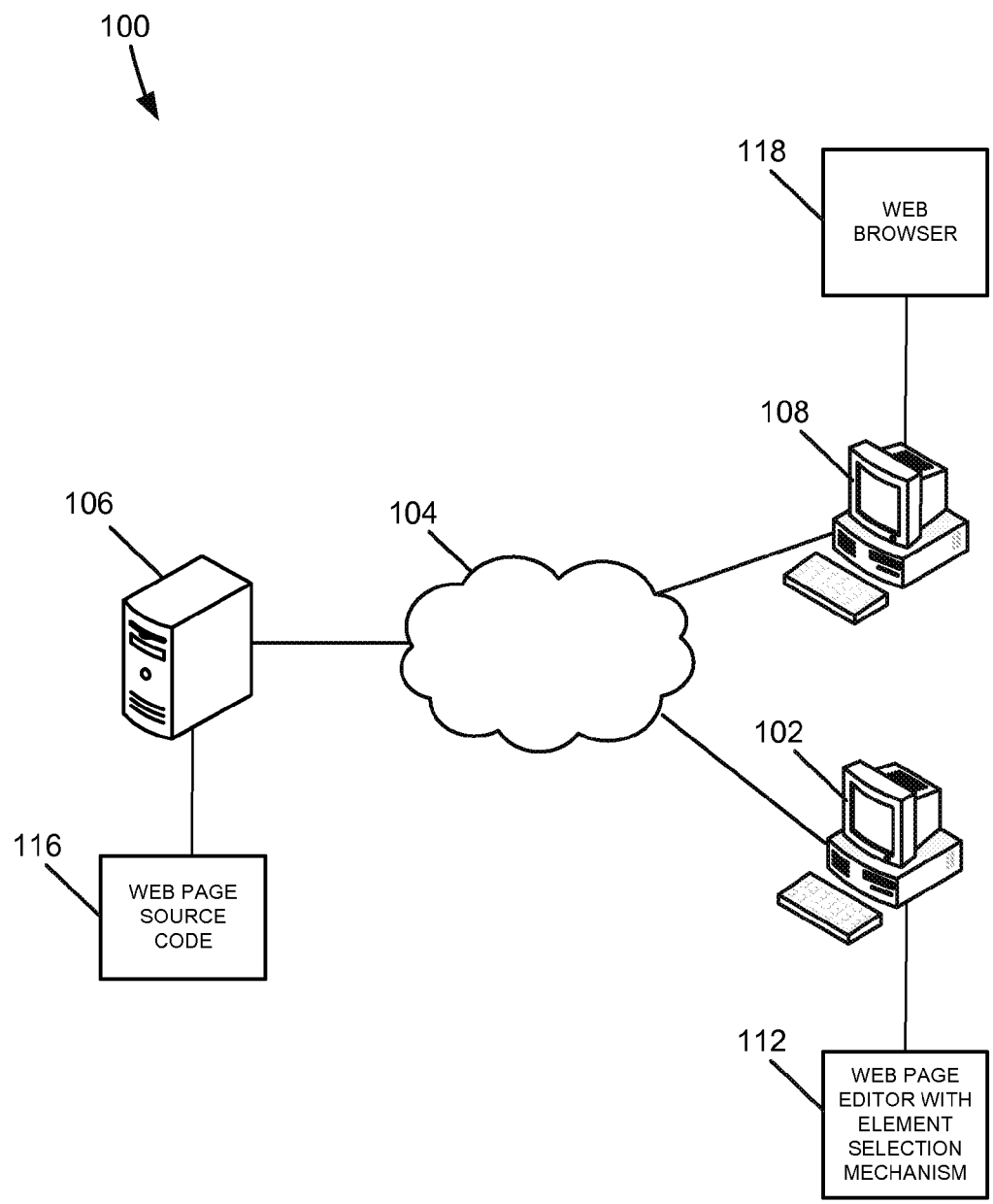
FIG. 1 is block diagram of an exemplary system for implementing aspects of the present disclosure.

Graphical web page editors are used to display a web page visually as it is being designed or edited. Graphical editors are sometimes referred to as What You See Is What You Get (WYSIWYG) editors. Users often find a graphical web page editor to be much easier to use than a text-based editor, because the users are able to see and interact with the web page elements that are arranged visually on the screen. Changes can be made by selecting the element to be changed, such as by clicking on the element using a mouse or other input device, and then modifying the element as desired. A difficulty arises when elements of the web page are arranged so that they overlap. In such a situation, it is sometimes difficult for the designer to select between the overlapping elements.

This disclosure will now more fully describe exemplary embodiments with reference to the accompanying drawings, in which specific embodiments are shown. Other aspects may, however, be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure generally relate to a graphical web page editor. In one non-limiting example, the graphical web page editor includes an element selection mechanism for selecting at least one of a plurality of web page elements.

FIG. 1 is block diagram of an exemplary system 100 for implementing aspects of the present disclosure. System 100 includes computing system 102, network 104, Web server 106, and client computing system 108.

Computing system 102 is operable to execute software applications. An example of computing device 102 is described with reference to FIG. 2. As shown in FIG. 1, computing system 102 includes web page editor 112. Web page editor 112 is a graphical software application that can be used to design a web page or edit an existing web page. Web page editor 112 includes an element selection mechanism described in more detail herein. The element selection mechanism is a tool that assists a web page designer in selecting between multiple overlapping elements in a web page, such that the appropriate element can then be reviewed, modified, or deleted.

Computing device 102 is communicatively connected to network 102. Network 102 is a data communication network that facilitates data communication between computing device 102, Web server 106, and client computing system 108. An example of network 102 is the Internet. Other examples of network 102 include an intranet, extranet, local-area network (LAN), wireless network, cellular network, plain-old telephone system (POTS) network, and other known data communication networks.

After a web page has been created or modified with web page editor 112, source code 116 is generated by web page editor 112. The source code 116 is communicated from client computing system 102 across network 104 and to Web server 106. Web server 106 receives web page source code 116, and stores it in a data storage device, such as memory, a hard drive, or other data storage device. Web server 106 operates to store web page source code 116, and to transmit web page source code 116 across network 104.

Client computing system 108 operates to display a web page to a user. Client computing system 108 requests web page source code 116 from Web server 106. Web server 106 transmits web page source code 116 across network 104 to client computing system 108. Client computing system 108 includes web browser 118 that is operable to read web page source code 116 and to display the resulting web page to the user. One example of web browser 118 is the INTERNET EXPLORER® Internet Browser sold by Microsoft Corporation of Redmond, Wash.

Figure 2:
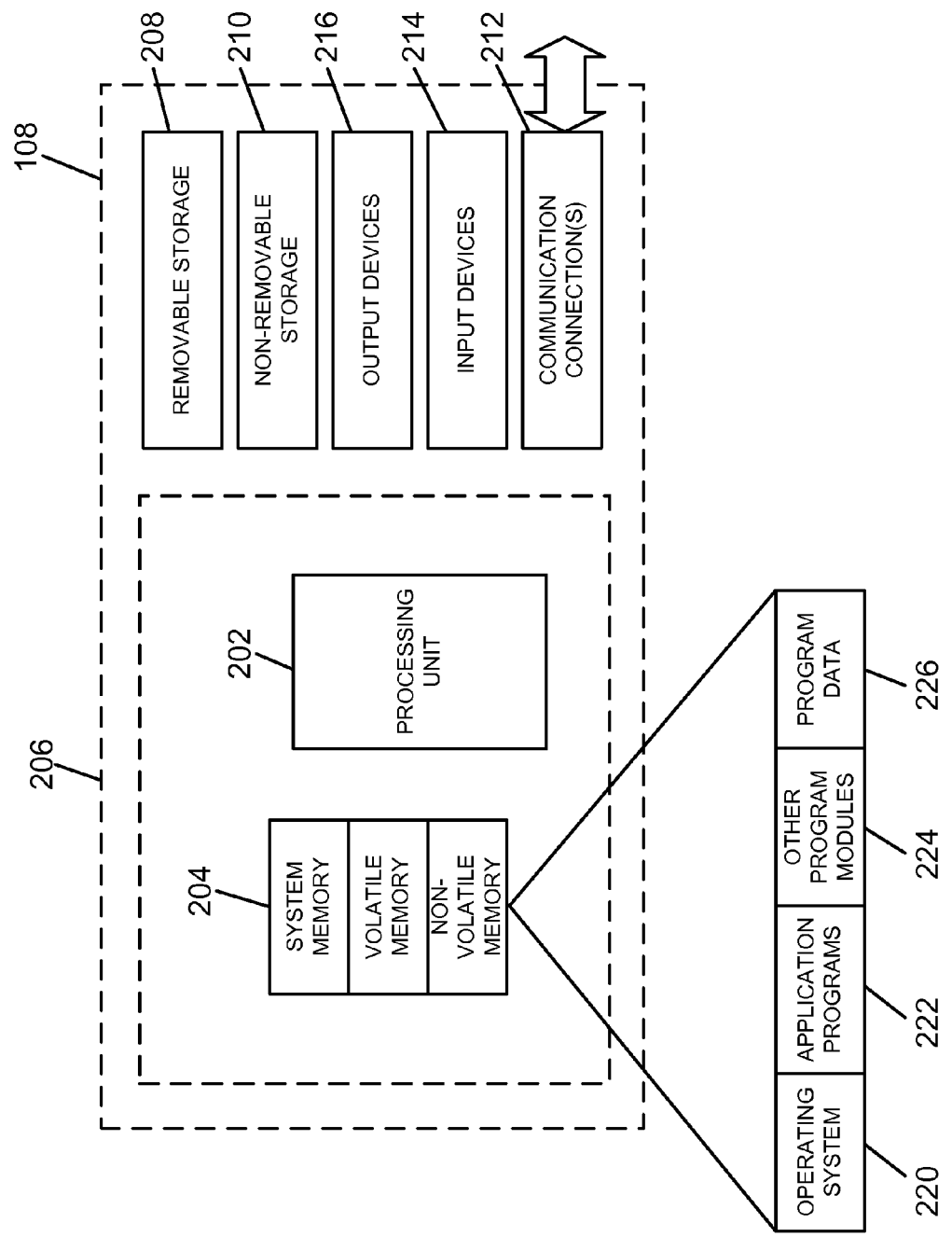
FIG. 2 is a block diagram of an example computing system of the system shown in FIG. 1.

FIG. 2 is an exemplary computing system 102 for implementing aspects of the present disclosure. Although described as an example of computing system 102, the computing system shown in FIG. 2 is also a suitable example of a Web server 106 and client computing system 108 (shown in FIG. 1).

In its most basic configuration, computing system 102 typically includes at least one processing unit 202 and memory 204. Depending on the exact configuration and type of computing system, memory 204 may be volatile (such as RAM), non-volatile (such as ROM, flash memory, etc.) or some combination of the two. This most basic configuration is illustrated in FIG. 2 by dashed line 206. Additionally, computing system 102 may also have additional features/functionality. For example, computing system 102 may also include additional storage (removable and/or non-removable) including, but not limited to, magnetic or optical disks or tape. Such additional storage is illustrated in FIG. 2 by removable storage 208 and non-removable storage 210.

Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing system 102. Any such computer storage media may be part of computing system 102.

Computing system 102 may also contain communications connection(s) 212 that allow the computing system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 102 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

In some embodiments, memory 204 includes one or more of operating system 220, application programs 222, other program modules 224, and program data 226. As described herein, computing system 102 includes web page editor 112, shown in FIG. 1. Web page editor 112 can receive input from a user through input devices 214, and can output information to a user through output devices 216. As one example, input is provided by a keyboard and a mouse to design a desired web page. Output is provided by a computer monitor or other display, such as to display a user interface, such as shown in FIG. 3.

Figure 3:
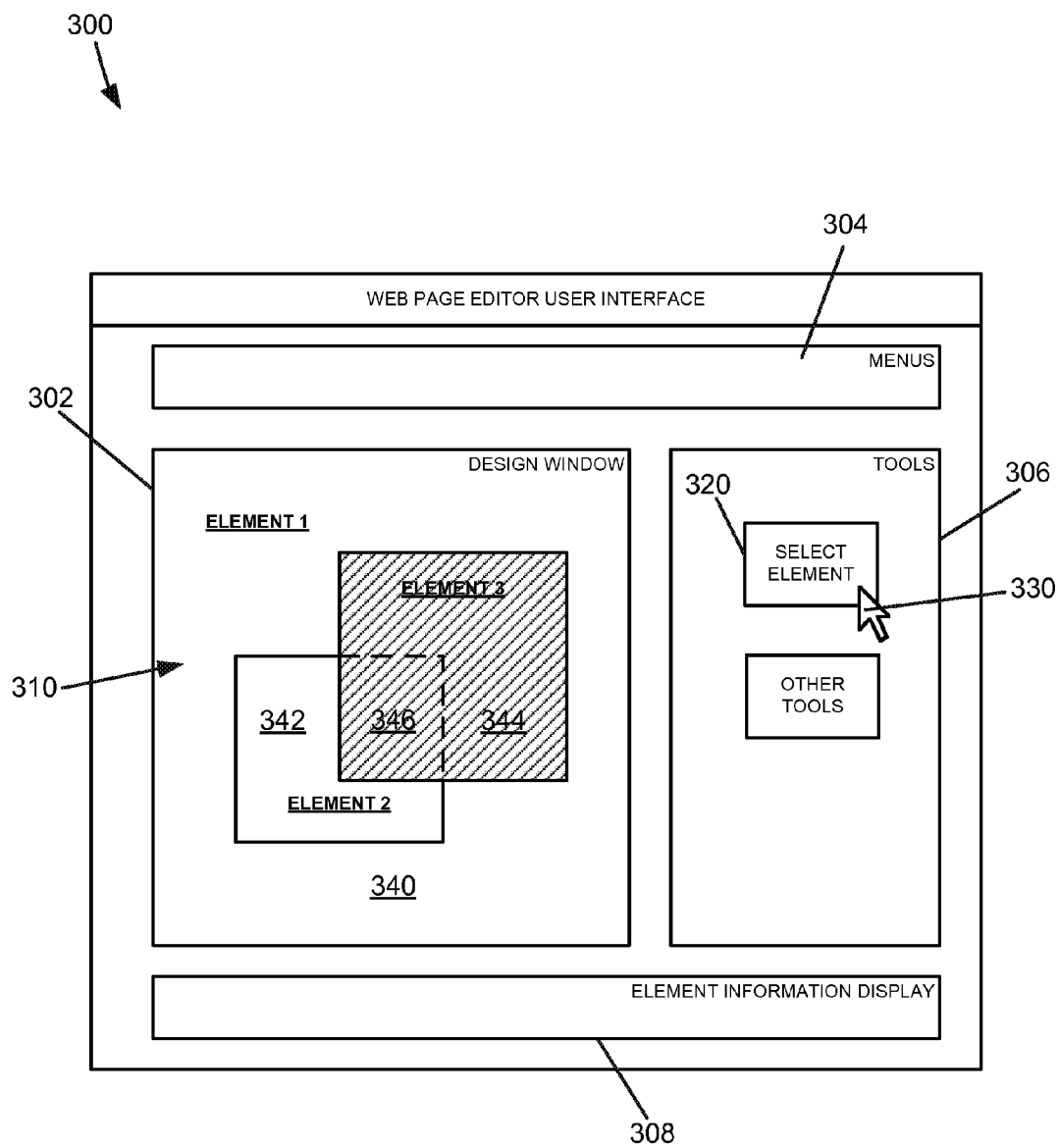
FIG. 3 is a screen shot of an exemplary user interface of the computing system shown in FIG. 2.

FIG. 3 is a screen shot of an exemplary user interface 300 of the computing system shown in FIG. 2. User interface 300 is a graphical user interface (GUI) that displays information in a visual form, as opposed to a purely text-based interface. User interface 300 is generated by web page editor 112 (shown in FIG. 1). In some embodiments, user interface 300 includes design window 302, menus 304, tools 306, and element information display 308. The user interface 300 allows a user to interact with web page editor 112 to select between different elements of a web page.

User interface 300 includes design window 302. Design window 302 displays a web page in graphical form while the web page is being designed or edited. Web page 310 includes at least two web page elements. Examples of web page elements include a body, a background, an image, text, a text box, a table, a frame, a button, a paragraph, a heading, a division, and other known web page elements. In this example, user interface 300 includes element 1, element 2, and element 3. User interface 300 allows elements to overlap. For example, element 1 is a body element, which is arranged behind elements 2 and 3. As a result, elements 1 and 2 are displayed by user interface 300 as being in front of element 3, such that they obscure portions of element 3 from view. (It is noted, however, that elements can be transparent such that they do not obscure other elements from view.) Element 3 is arranged partially in front of element 2. FIG. 3 illustrates a state in which element 3 is selected, as indicated by cross-hatching.

It is noted that web page 310 includes elements that are only partially overlapping. In some embodiments, web page 310 includes an element that is completely overlapped by one or more other elements.

The order in which elements are displayed in web page 310 is sometimes referred to as the "z-order" of the elements. The z-order defines the arrangement of elements along a hypothetical z-axis extending normal to a screen of the display. In HTML, elements can be assigned a z-order using a DIV element. The z-order is typically an integer value. An element having a z-order of "1" is typically displayed as being behind other elements having z-orders higher than "1", such as "2" or "3." As a result, if a first element having a z-order of "1" is arranged in a common space as a second element having a z-order of "2", the second element will be displayed as partially or fully obscuring the first element from view.

In some embodiments, user interface 300 includes menus 304. An example of menus 304 is a menu bar including "File", "Edit", "View", "Format", and "Help" menus. Such menus are well known and need not be described in detail herein. Other embodiments include other menus, such as a ribbon.

Tools 306 allow a user to select from various tool functions provided by the web page editor. One example of tool 306 is select element tool 320. Select element tool 320 can be selected by a user, such as with pointer 330, to initiate element selection as described in more detail below. Tools 306 can include other tools 308, such as to add additional elements, reorder element, modify element, delete elements, change element properties, and the like.

Element information display 308 displays information about a selected element. Element information display 308 is optional, but can be useful for displaying information such as an identifier of the selected element, the position of the selected element, or other properties of the selected element.

Design window 302, including elements 1, 2, and 3, is divided into four selection regions. A first selection region 340 is the region of design window 302 including portions of element 1 outside of elements 2 and 3. A second selection region 342 is the region that is shared between elements 1 and 2 that is not shared with element 3. A third selection region 344 is the region that is shared between elements 1 and 3 that is not shared with element 2. A fourth selection region 346 is the region that is shared between all elements 1, 2, and 3.

One way to select an element in design window 302 is to click on the element in the appropriate selection region. For example, element 1 can be selected by clicking in selection region 340. Element 1 will be selected because it is the only element present within the selection region 340.

When elements are overlapping, areas of selection ambiguity exist. For example, selection region 346 includes all of elements 1, 2, and 3. If a user clicks within selection region 346, web page editor 112 is unable to determine which of the elements the user wants to select. As a result, web page editor 112 defaults to one of the elements, such as element 3, because it is in front of elements 2 and 1 at that location.

User interface 300 includes an element selection mechanism for unambiguously identifying an element to be selected. The element selection mechanism is initiated by a user by providing an input. One example of such an input is selecting select element tool 320, such as by clicking with a mouse. Another example of such an input is by using a keyboard shortcut, such as an "F" key (e.g., pressing the F4 key) or any other suitable combination of keys. Multiple input devices can also be used, such as holding the CTRL key while clicking the mouse at a desired location. As shown in FIG. 3, a mouse pointer 330 is used in some embodiments to select the select element tool 320 to initiate element selection.

Once the element selection mechanism has been initiated, web page editor 112 determines that the user desires to select an element from design window 302. Therefore, web page editor 112 awaits further input.

Figure 4:
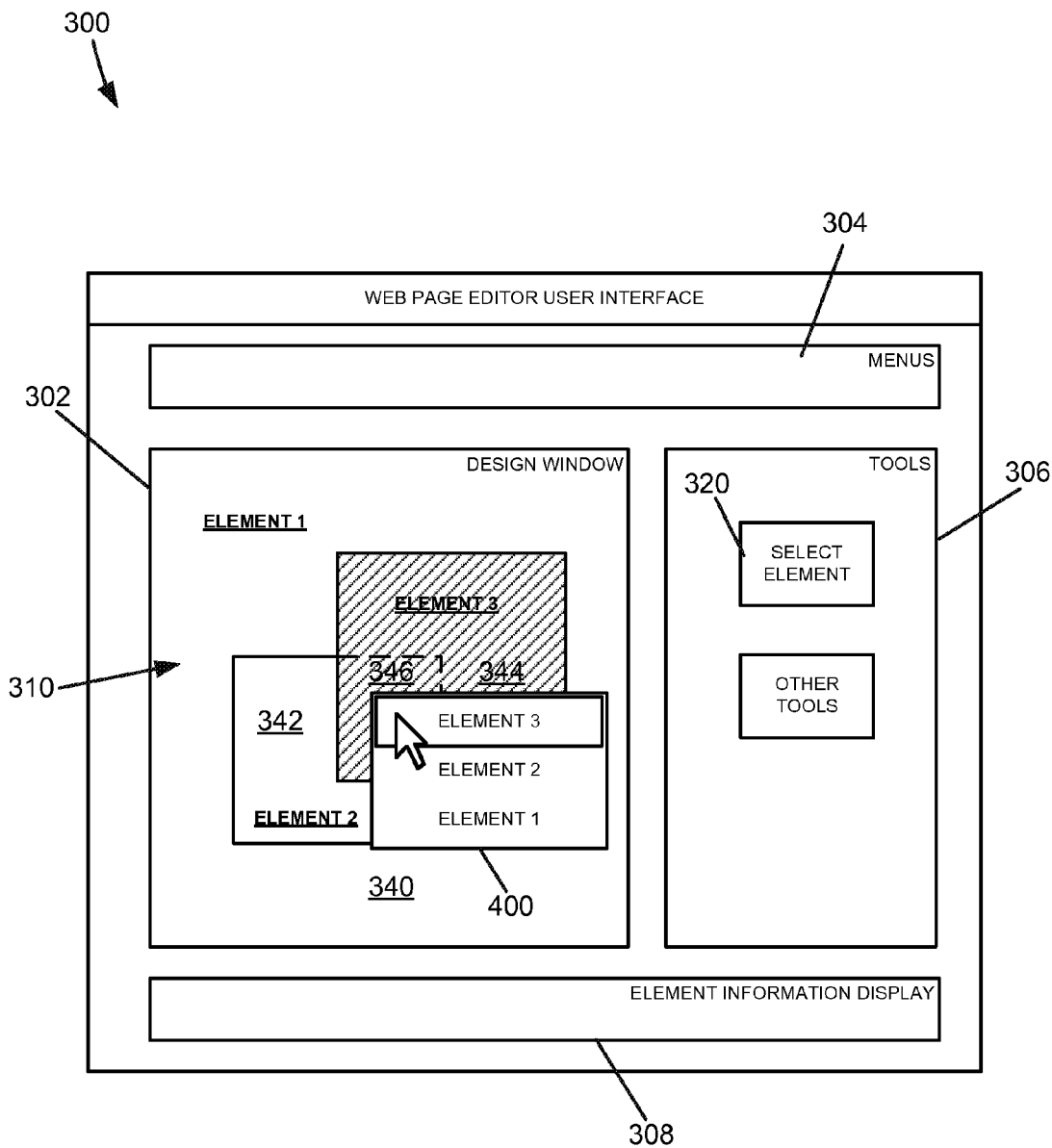
FIG. 4 is another screen shot of the user interface shown in FIG. 3.

FIG. 4 is another screen shot of user interface 300. After select element tool 306 has been selected (or another select element input has been provided), user interface 300 receives an input from the user indicating the location of an element to be selected. In this example, the user selects a location within selection region 346. The input is provided, for example, by moving pointer 330 to the desired location and clicking a mouse button. Other types of inputs are provided in other embodiments.

Web page editor 112 receives the input from the user, and determines what elements are present at the indicated location. In some embodiments the input is provided in the form of a screen coordinate. In some embodiments, Web page editor 112 receives the coordinate and compares the coordinates to DrawRecords of the elements of web page 310. If only a single element is present at that location, then web page editor 112 determines that there is no ambiguity, and as a result the element is selected. If two or more elements are present at the location, then web page editor 112 determines that an ambiguity exists and that additional input is needed. In this example, selection region 346 includes three elements, and therefore web page editor 112 determines that additional input is needed.

As a result, user interface 300 is updated to include element selection menu 400. Element selection menu 400 includes a list of all elements present at the indicated location, and prompts the user to select one of the elements. In this example, elements 1, 2, and 3 are all listed, because they are all present at the indicated location within selection region 346.

DrawRecords are used in some embodiments. DrawRecords are internal data items that correspond to an area (typically a rectangular area) of a design surface. The DrawRecords are transient data items that are recomputed during each layout cycle. The DrawRecords cache coordinates and other display properties of the associated elements once their final values are determined by a layout engine. The layout engine operates to parse HTML code, gather the display properties of all elements of the page, and then lay them out sequentially on the page to determine the final display properties. The final display properties are stored in the DrawRecords of each element. In some embodiments, DrawRecords contain the following data: the rectangular area that the element occupies (x-coordinate, y-coordinate, width, and height), parent DrawRecord, children DrawRecords, computed set of Cascading Style Sheets (CSS) properties, actual data and method of rendering (e.g., text, image, tag, and the like).

Once an input is received from the user identifying a coordinate of the display, the DrawRecords of each element are evaluated to determine whether or not that element is present at the identified coordinate. The identified coordinate has an x component and a y component. If the x component is within the range defined by the x-coordinate and the width, and the y component is within the range defined by the y-coordinate and the height, then it is determined that the element is present at the identified coordinate. If not, then it is determined that the element is not present at the identified coordinate.

Figure 5:
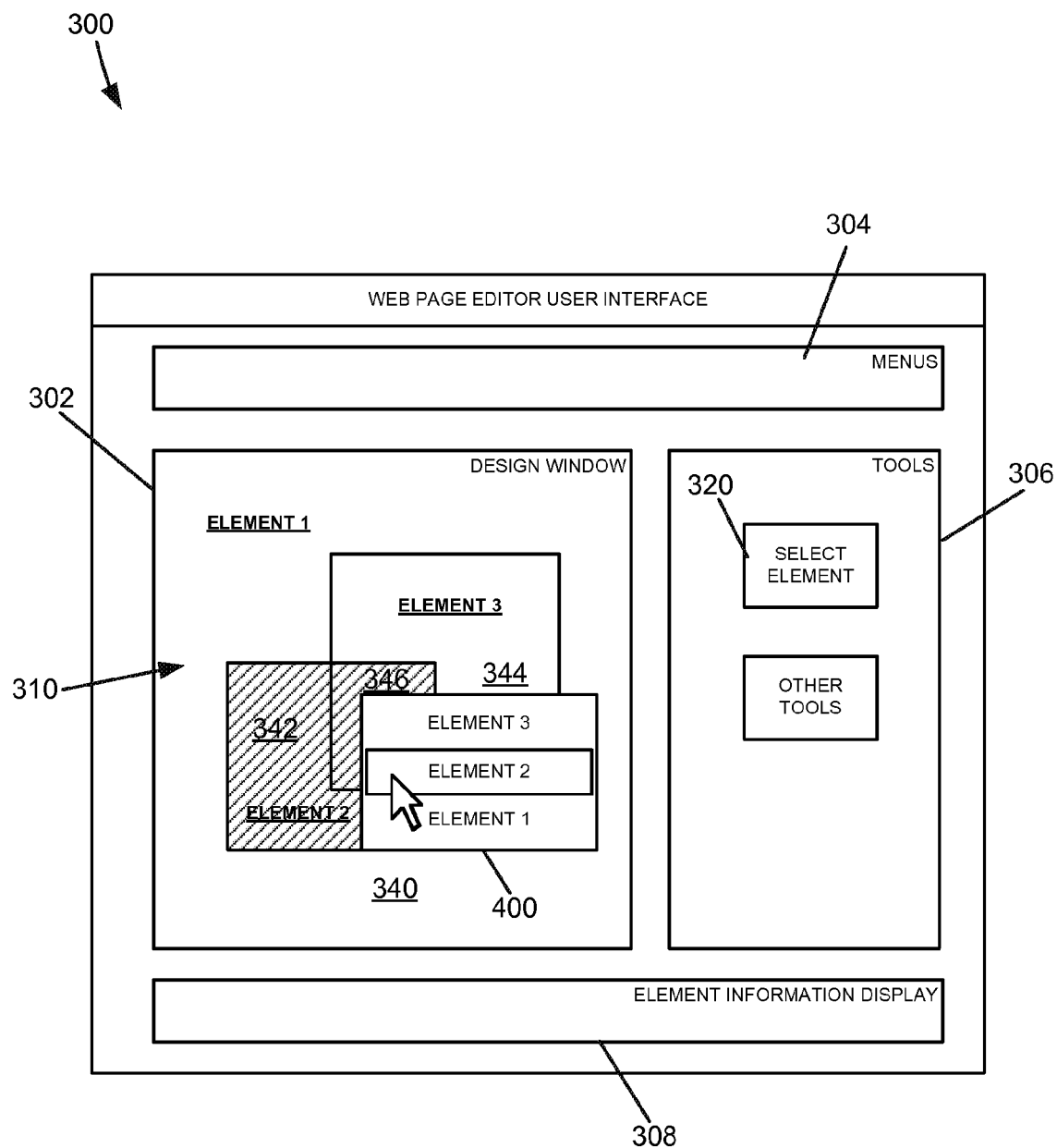
FIG. 5 is another screen shot of the user interface shown in FIG. 3.

FIG. 5 is another screen shot of user interface 300. Once element selection menu 400 has been displayed, the user is prompted to select from element selection menu 400. In this example, the user desires to select element 2, which is located partially between elements 1 and 3. The user provides an input to move pointer 330 over the desired element identifier in the element selection menu. When pointer 330 is placed in a position over the element identifier of selection menu 400, the associated element is automatically selected. For example, element 2 is selected as pointer 330 is moved over the element identifier "element 2." The selection change is represented by the cross-hatching of element 2, shown in FIG. 5. Similarly, the appearance of the element is changed on user interface 300, such as by changing the color of the element or changing a border around the element. Element information display 308 is also updated to display information about the selected element (e.g., element 2), if desired. An advantage of changing the selection as pointer 330 is moved over the element identifier is that it allows the user to visually determine whether the element associated with the identifier is the element the user desires to select. If it isn't, the user can move pointer 330 to another element identifier, in which case the associated element is selected.

Once the desired element has been located and selected, the user dismisses the element selection menu 400. This can be done, for example, by clicking a mouse button, hitting an escape key, or with another input.

Figure 6:
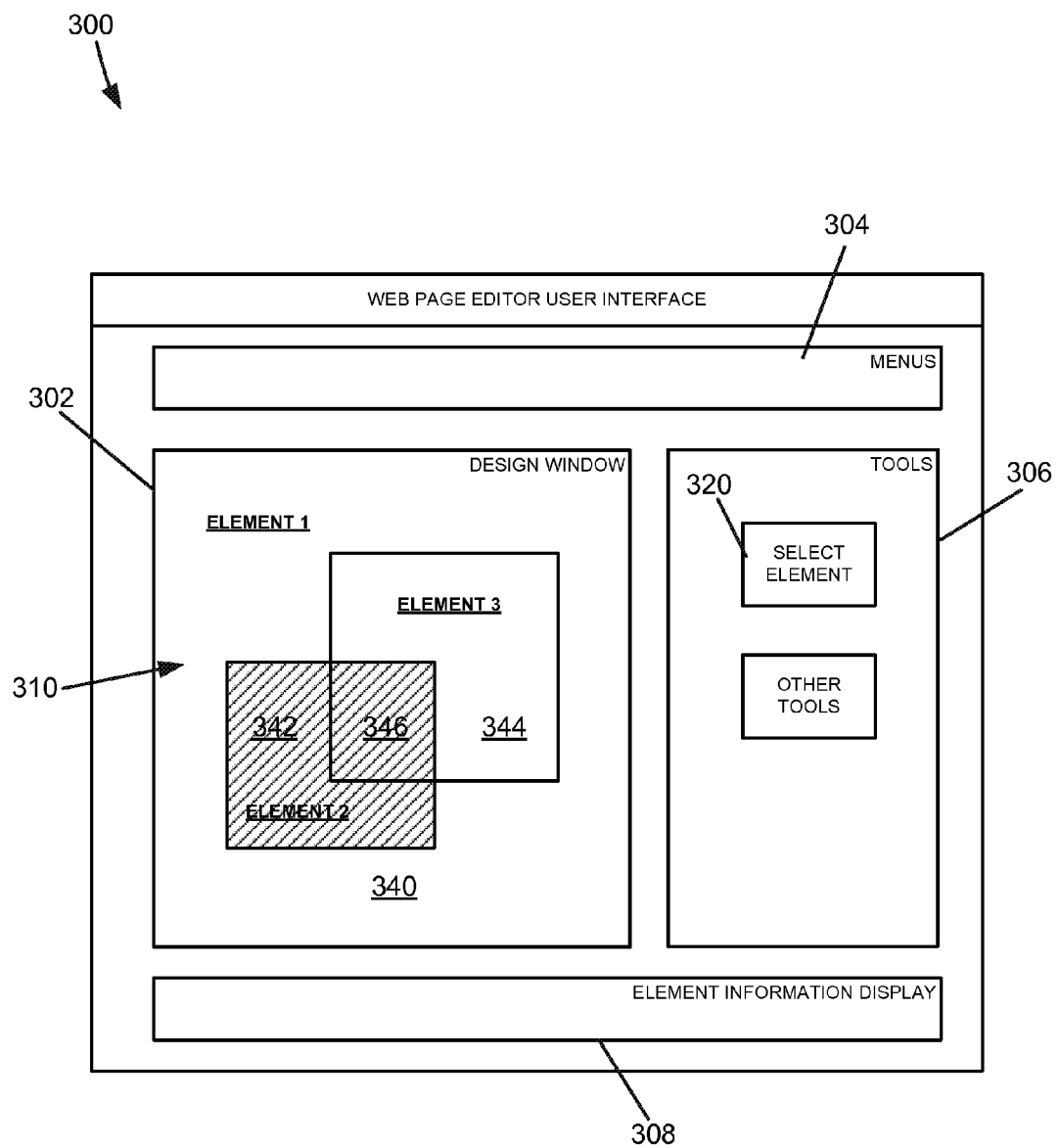
FIG. 6 is another screen shot of the user interface shown in FIG. 3.

FIG. 6 is another screen shot of user interface 300. After the user has indicated the element to be selected, web page editor 112 operates to select the desired element, and updates user interface 300 to show that the element has been selected. In this example, element 2 is selected (as represented in FIG. 6 by cross-hatching). If desired, other features of user interface 300 are also updated to indicate the selection of element 2. For example, element information display 308 is updated to display information about element 2.

Once the desired element (e.g., element 2) has been selected, the user can interact with user interface 300 to change, modify, delete, copy, or add to element 2. For example, various properties of the element can be changed, such as to resize or reposition the element, to change a color, to add or remove text, to insert additional elements, or make any other desired modification involving the element.

Figure 7:
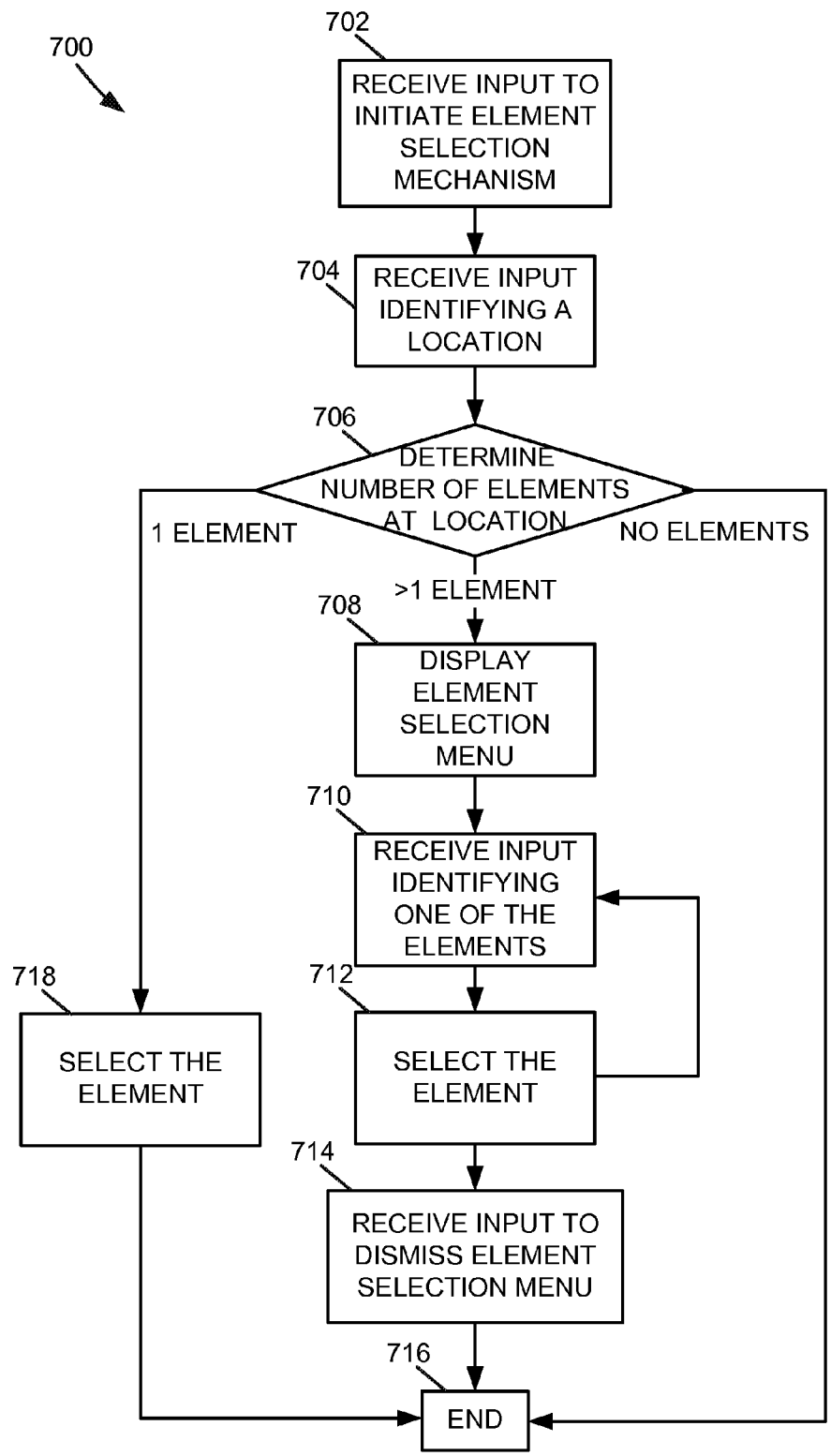
FIG. 7 is flow chart illustrating an exemplary method of selecting a web page element.

FIG. 7 is flow chart illustrating an exemplary method 700 of selecting a web page element. Method 700 begins with operation 702, during which an input is received to initiate an element selection mechanism. Operation 704 is then performed to receive an input identifying a location on the user interface. In some embodiments, the location includes coordinates. The location identifies a point in the user interface.

Operation 706 is then performed to determine the number of elements at the location. Operation 706 identifies the number of elements that are present at the identified location. If there are no elements at the location, method 700 proceeds to operation 716 and ends. If there is only a single element, then method 700 proceeds to operation 718 to select the element present at the identified location. Following operation 718, operation 716 is performed to end method 700.

If more than one element is present at the location, operation 708 is then performed to display an element selection menu. In some embodiments, operation 708 displays a menu listing all elements identified in operation 706. A list of all elements present at the location is displayed.

Operation 710 is then performed to receive input identifying one of the elements from the element selection menu. When the input is received, operation 712 is performed to select the element. In some embodiments, selection of the element includes updating a user interface to provide a visual indication of the element that has been selected. If desired, a subsequent input can be received at operation 710, to identify another element from the element selection menu, and to select the element in operation 712.

Once the desired element has been selected, operation 714 is performed in which an input is received and the element selection menu is dismissed. Operation 716 is then performed to end method 700.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer readable storage medium comprising computer executable instructions which when executed by a computer cause the computer to:
　　display a user interface of a web page editor with the computer, the user interface including a web page having two or more at least partially overlapping elements;
　　identify a point on the web page where at least two of the elements are overlapping;
　　display an element selection menu in the user interface, the element selection menu including a text-based list of the overlapping elements that are at the identified point of the web page;
　　receive an input choosing one of the overlapping elements from the list in the element selection menu; and
　　highlight the element chosen from the list.

2. The computer readable storage medium of claim 1, wherein the computer executable instructions further cause the computer to modify the element chosen from the list.

3. The computer readable storage medium of claim 1, wherein the computer executable instructions further cause the computer to receive a button selection prior to identifying the point on the web page, and await input of the point.

4. The computer readable storage medium of claim 1, wherein the computer executable instructions further cause the computer to remove the element selection menu from the user interface after receiving a click input while maintaining the highlighting of the element.

5. A method of selecting an element of a web page using a web page editor, the method comprising:
　　generating a graphical user interface of a web page editor, the graphical user interface including a design window;
　　displaying the web page in the design window to permit editing of the web page, wherein the web page includes at least two elements graphically depicted within the design window, and wherein a first of the elements is graphically depicted as being positioned in front of a second of the elements;
　　initiating an element selection operation;
　　receiving an input from a user through a pointer device identifying a point on the web page in the web page editor where the first of the elements overlaps the second of the elements;
　　displaying an element selection menu, the menu including a text-based list of the elements of the web page that are at the point, the text-based list including at least the first and second of the elements;
　　upon movement of a pointer over one of the elements listed in the element selection menu, highlighting a corresponding one of the elements in the design window to permit the user to visually identify the corresponding one of the elements; and
　　upon receipt of a click input onto the one of the elements listed in the element selection menu, selecting the corresponding one of the elements to permit editing of the element, wherein the selection concludes the element selection operation.

6. The method of claim 5, further comprising determining a number of elements of the web page at the point after identifying the point on the web page.

7. A computing system comprising:
an input device for receiving input from a user;
a display device for generating a user interface;
a processor communicatively connected to the input device and the display device; and
memory storing program instructions, which when executed by the processor cause the computing system to:
display a preview of a web page in a web page editor with the display device, the web page including at least two at least partially overlapping elements of the web page;
receive an input with the input device identifying a point of the web page that is located in a region of the web page where the at least two at least partially overlapping elements of the web page are overlapping;
generate and display with the display device a text-based list of the at least two at least partially overlapping elements of the web page that are at the point with the display device; and
highlight one of the overlapping elements after a pointer hovers over the list.

8. The computing system of claim 7, wherein the instructions further cause the computing system to:
receive further input with the input device causing a pointer to hover over one of the listed elements;
highlight one of the overlapping elements associated with the one of the listed elements;
receive further input with the input device causing the pointer to hover over another of the listed elements;
highlight another of the overlapping elements associated with the another of the listed elements; and
receive a selection with the input device to remove the display of the list and keeping at least one of the elements highlighted.

9. The computing system of claim 7, wherein the instructions further cause the computing system to:
receive a request to modify a selected element; and
modify the selected element based on the request.

10. The computing system of claim 9, further comprising a communication device configured to communicate across a communication network, wherein the instructions further cause the computing system to communicate the web page across the communication network to for storage of the web page on a web server after modifying the first element.

11. The computing system of claim 9, wherein modifying the selected element is an action selected from the group consisting of: adding to the selected element, modifying a property of the selected element, modifying a content of the selected element; moving the selected element, resizing the selected element, deleting the selected element, and copying the selected element.

12. The computing system of claim 7, wherein at least some of the elements of the web page are selected from the group consisting of: a body, a background, an image, text, a text box, a table, a frame, a button, a paragraph, a heading, and a division.

* * * * *

UNITED STATES PATENT AND TRADEMARK OFFICE
CERTIFICATE OF CORRECTION

| | | |
|---|---|---|
| PATENT NO. | : 8,078,979 B2 | Page 1 of 1 |
| APPLICATION NO. | : 11/945526 | |
| DATED | : December 13, 2011 | |
| INVENTOR(S) | : Robert M. Howard et al. | |

It is certified that error appears in the above-identified patent and that said Letters Patent is hereby corrected as shown below:

In column 10, line 18, in Claim 10, after "network" delete "to".

Signed and Sealed this
Seventh Day of February, 2012

David J. Kappos
*Director of the United States Patent and Trademark Office*